(12) United States Patent
Iwaki

(10) Patent No.: US 6,989,914 B2
(45) Date of Patent: Jan. 24, 2006

(54) IMAGE PROCESSING APPARATUS AND PHOTOPRINTER USING THE SAME

(75) Inventor: Yasuharu Iwaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1206 days.

(21) Appl. No.: 09/775,813

(22) Filed: Feb. 5, 2001

(65) Prior Publication Data

US 2001/0017689 A1 Aug. 30, 2001

(30) Foreign Application Priority Data

Feb. 4, 2000 (JP) .............................. 2000-027119

(51) Int. Cl.
*H04N 1/40* (2006.01)
*H04N 1/407* (2006.01)
*H04N 1/50* (2006.01)
*H04N 1/60* (2006.01)
*G06K 15/12* (2006.01)

(52) U.S. Cl. ...................... 358/1.9; 358/2.1; 358/1.13; 358/521; 358/527

(58) Field of Classification Search ................ 358/1.9, 358/3.01, 3.21, 3.24, 3.26, 2.1, 462, 518, 358/521, 501, 527, 401, 296, 1.13
See application file for complete search history.

(56) References Cited

U.S. PATENT DOCUMENTS

| 5,748,794 | A | * | 5/1998 | Maeda et al. ............... 358/3.21 |
| 6,025,929 | A | * | 2/2000 | Nakajima et al. ............ 358/1.9 |
| 6,473,198 | B1 | * | 10/2002 | Matama ...................... 358/1.9 |
| 6,577,751 | B2 | * | 6/2003 | Yamamoto .................. 358/1.9 |
| 6,728,428 | B1 | * | 4/2004 | Kinjo .......................... 358/518 |
| 6,819,439 | B2 | * | 11/2004 | Hayashi et al. ............. 358/1.13 |
| 2001/0048530 | A1 | * | 12/2001 | Hayashi et al. ............. 358/1.13 |
| 2002/0122588 | A1 | * | 9/2002 | Yamamoto .................. 382/167 |
| 2003/0202715 | A1 | * | 10/2003 | Kinjo .......................... 382/162 |

* cited by examiner

*Primary Examiner*—Scott A. Rogers
(74) *Attorney, Agent, or Firm*—Morgan Lewis & Bockius LLP

(57) ABSTRACT

The image processing apparatus and the photoprinter include a condition setting section for setting image processing conditions by analyzing image data, an image processing section for executing image processing in accordance with the image processing conditions set in the condition setting section, a mode setting an section including a plurality of operation modes, setting a operation mode from among the plurality of operation modes and changing at least one of a processing content in the condition setting section and a content of the image processing executed in the image processing section in accordance with the thus set operation mode, and optionally a selection device for selecting the operation mode.

12 Claims, 3 Drawing Sheets

IMAGE PROCESSING APPARATUS AND PHOTOPRINTER USING THE SAME

BACKGROUND OF THE INVENTION

The present invention relates to the technical field of a digital image processing, and more specifically, to an image processing apparatus and a photoprinter using the same that can perform effective and appropriate processing in accordance with a job intended by the photoprinter in the print manufacturing, and the like.

Most of the images recorded on photographic films such as negatives and reversals (which are hereinafter referred to as "films") are conventionally printed onto light-sensitive materials (photographic papers) by a technique generally called "direct exposure" in which the image on a film is projected onto the light-sensitive material for a real exposure.

A printer that adopts digital exposure has recently been commercialized. In this "digital photoprinter", the image recorded on a film is read photoelectronically and converted into digital signals, which are subjected to various kinds of image processing to produce recording image data; a light-sensitive material is exposed by scanning with recording light modulated in accordance with the image data, thereby recording a (latent) image which is then processed photoelectronically to produce a (photographic) print.

Having these features, the digital photoprinter is composed of the following three basic components: a scanner (image reading apparatus) which applies reading light onto a film and reads the light projected therefrom, thereby photoelectronically reading the image recorded on a film; an image processing apparatus which performs predetermined processing to the image data read with the scanner and to the image data supplied from a digital camera and the like to obtain the image data of an recorded image, that is, exposing conditions; a printer (image recording apparatus) which scan exposes a light-sensitive material with, for example, a light beam in accordance with the image data supplied from the image processing apparatus and records a latent image; and a processor (developing apparatus) which subjects the light-sensitive material exposed by the printer to development processing and manufactures a (finished) print on which the image is reproduced.

According to the digital photoprinter, since an image can be appropriately processed as digital image data, it is preferably subjected to gradation adjustment, color balance adjustment, color/density adjustment, sharpness processing, and the like. Accordingly, a print of high quality that cannot be obtained by conventional direct exposure can be obtained.

Moreover, the digital photoprinter can output not only the image recorded on a (photographic) film but also the image photographed by a digital camera and the like, the image data recorded on a recording medium such as a MO (magneto-optical recording medium) and the like, the image data obtained through a communication device such as internet and the like as a print.

Incidentally, a different performance is required to the digital photoprinter depending upon how the digital photoprinter is used in print manufacturer such as a photo-labo and the like where prints are manufactured.

For example, a print shop the sales talk of which is to manufacture a print at a low price often puts an emphasis on productivity even if the quality of an image reproduced on a print is somewhat sacrificed.

Inversely, in a print of a photograph taken by a photo studio and in a print; manufactured by a photo-print shop to which many custom prints are ordered, an emphasis is ordinarily put on the quality of the image reproduced on a print even if productivity is somewhat sacrificed.

However, there is a contradiction between the above requirements in a sense, that is, in general, when one of the performances is increased, the other thereof is decreased.

For example, an image of high quality can be obtained by the execution of time-consuming accurate image processing at the sacrifice of productivity, whereas when an emphasis is put on productivity, it is preferable not to perform time-consuming image processing with a result of deteriorated image quality.

Accordingly, the performance of a conventional photoprinter is set to satisfy various kinds of required characteristics such as image quality, productivity, and the like on average, which is a reason why print manufactures are not satisfied with the performance of the conventional photoprinter sometimes.

SUMMARY OF THE INVENTION

Accordingly, it is a first object of the present invention for solving the problem of the conventional technology to provide an image processing apparatus capable of preferably satisfying the various kinds of performances required to a photoprinter such as productivity, image quality, uniformity of images processed in one case, and the like and capable of preferably manufacturing a print in accordance with the state in which the photoprinter is used by a print shop and with the intention of a person who requests to manufacture a print.

Further, it is a second object of the present invention to provide a photoprinter using the image processing apparatus described above.

In order to attain the first object described above, the first aspect of the present invention provides an image processing apparatus comprising a condition setting section for setting an image processing conditions of image date by analyzing the image data supplied from an image data supply source; an image processing section for subjecting the image data to image processing in accordance with the image processing conditions set in the condition setting section; a mode setting section including a plurality of operation modes, the mode setting section setting a operation mode from among the plurality of operation modes and changing at least one of a processing content in the condition setting section and a content of the image processing executed in the image processing section in accordance with the operation mode set.

It is preferable that the image processing apparatus further comprises a selection device for selecting the operation mode to set the operation mode in the mode setting section out of the plurality of operation modes.

It is also preferable that the plurality of operation modes be at least two of an operation mode for reducing inappropriate prints, an operation mode for putting an emphasis on image quality, an operation mode for reducing the fluctuation of one case, and an operation mode for putting an emphasis on production speed.

It is further preferable that density control based on the face region of a person be executed and further gradation be softened in the operation mode for reducing inappropriate prints, gray/color gradation control be executed in accordance with at least one of a photographed scene, film exposure and a type of a film in the operation mode for putting an emphasis on image quality, image processing condition, be set using all the image data of one case in the operation mode for reducing the fluctuation of one case, and gray balance correction and density correction be executed in the operation mode for putting an emphasis on production speed.

It is another preferable that the image data supply source is at least one of a scanner which reads photoelectrically an image from a photographic film to obtain the image data, a medium driver which reads out the image data from a image data recording medium and a communication device which receives the image data.

In order to attain the second object described above, the second aspect of the present invention provides a photoprinter comprising an image data supply source for supplying image data of an image; a condition setting section for setting an image processing conditions of the image data for outputting a print on which the image is reproduced, by analyzing the image data supplied from the image data supply source; an image processing section for subjecting the image data to image processing in accordance with the image processing conditions set in the condition setting section; and a print section fox outputting the print on which the image has been reproduced based on the image data subjected to the image processing by the image processing section; further including: a plurality of operation modes; and a mode setting section for setting a operation mode from among the plurality of operation modes and changing at least one of a processing content in the condition setting section and a content of the image processing executed in the image processing section in accordance with the operation mode set.

It is preferable that photoprinter further comprises a selection device for selecting the operation mode to set the operation mode in the mode setting section out of the plurality of operation modes.

It is also preferable that the plurality of operation modes are at least two of an operation mode for reducing inappropriate prints, an operation mode for putting an emphasis on image quality, an operation mode for reducing the fluctuation of one case, and an operation mode for putting an emphasis on production speed.

It is further preferable that density control based on the face region of a person is executed and further gradation is softened in the operation mode for reducing inappropriate prints; gray/color gradation control is executed in accordance with at least one of a photographed scene, film exposure and a type of a film in the operation mode for putting an emphasis on image quality; image processing conditions are set using all the image data of one case in the operation mode for reducing the fluctuation of one case; and gray balance correction and density correction are executed in the operation mode for putting an emphasis on production speed.

It is another preferable that the image data supply source is at least one of a scanner which reads photoelectrically the image from a photographic film to obtain the image data, a medium driver which reads out the image data from the image data recording medium and a communication device which receives the image data.

It is still further preferable that the condition setting section calculates as the image processing conditions appropriate correction amounts of the image for reproducing preferably the image based on the image data.

It is still another preferable that the mode setting section changes as the processing content in the condition setting section at least one of operation algorithm for calculating the appropriate correction amounts of the image and operation parameters therefor.

DETAILED DESCRIPTION OF THE INVENTION

An image processing apparatus and a photoprinter using the same of the present invention will be described below in detail with reference to a preferable embodiment shown in the accompanying drawings.

Figure 1:
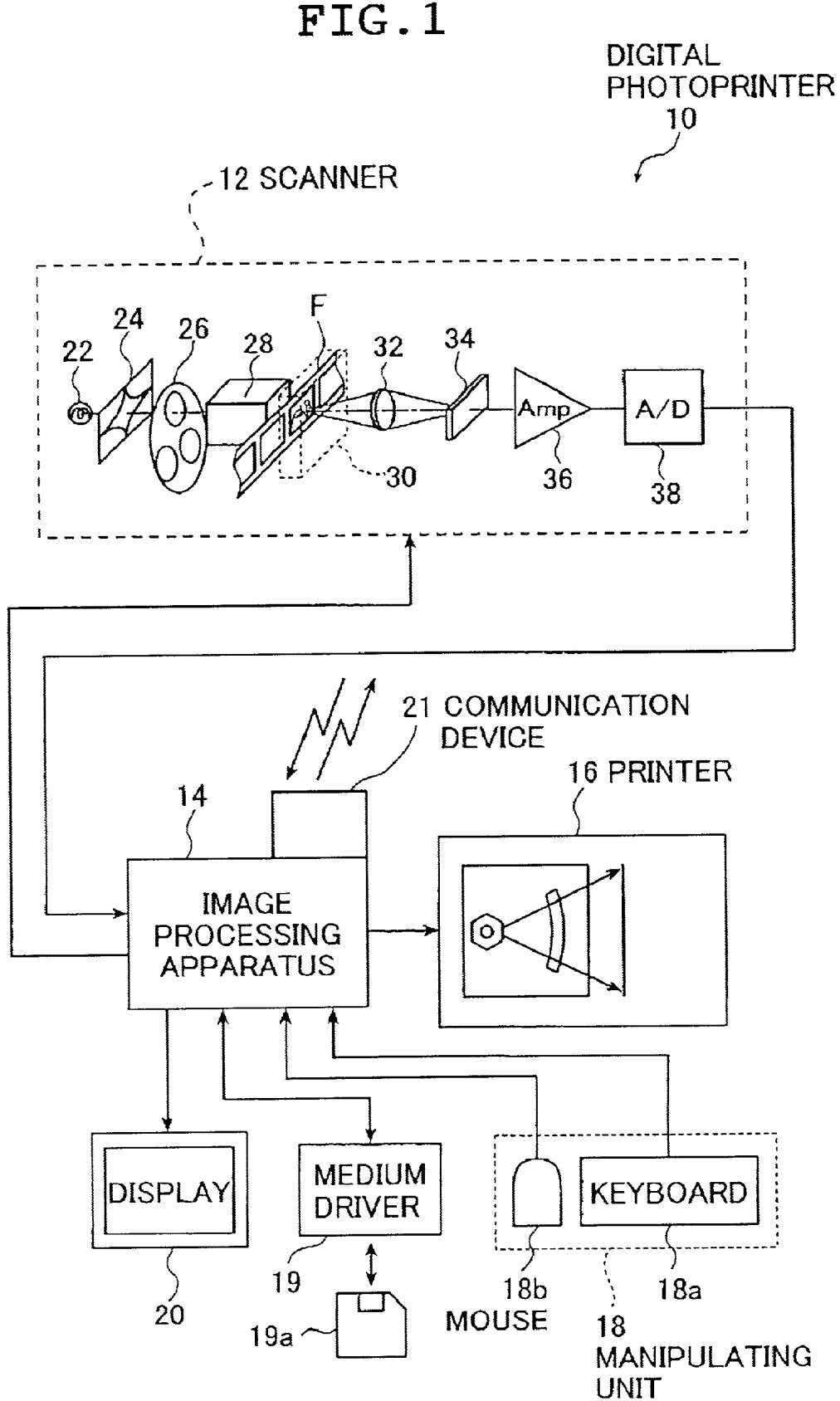
FIG. 1 is a block diagram of an embodiment of a digital photoprinter of the present invention to which an image processing apparatus of the present invention is applied.

FIG. 1 is a block diagram of an embodiment of a digital photoprinter of the present invention making use of the image processing apparatus of the present invention;

The digital photoprinter generally indicated by numeral 10 in FIG. 1 and simply referred to as the "photoprinter" basically includes a scanner (image reading apparatus) 12, an image processing apparatus 14 and a printer/processor (printing apparatus) 16. Connected to the image processing apparatus 14 are a manipulating unit 18 having a keyboard 18a and a mouse 18b for inputting (setting) various conditions, selecting and instructing specific processing and entering a command and so forth for effecting color/density correction and the like, as well as a display 20 for displaying a simulated image for verification.

Further, a medium driver 19 and a communication device 21 as an image inputting/outputting device are connected to the image processing apparatus 14. The medium driver 19 drives an image data recording medium 19a such as an MO, a FD and the like to read out the image data recorded on the image data recording medium 19a and record (write) the image data on the image data recording medium 19a. The communication device 21 acquires and delivers the image data via a communication network such as an internet.

The scanner 12 is an apparatus with which the images recorded on a film F or the like are read photoelectrically frame by frame, and includes a white illuminant 22, a variable diaphragm 24, a color filter plate 26, a diffuser box 28 with which the reading light incident on the film F is made uniform on the plane thereof, a carrier 30, an imaging lens unit 32, an area CCD sensor (hereinafter simply referred to as "CCD sensor") 34, an amplifier 36, and an A/D (analog/digital) converter 38.

When the images that are recorded on the film F are read with the scanner 12 arranged as described above, reading light issuing from illuminant 22 is adjusted in quantity by passage through the variable diaphragm 24, then passed through the color filter plate 26 for color adjustment, and diffused in the diffuser box 28; the thus treated reading light is incident on one frame of the film F that is held at a predetermined reading position by the carrier 30, through which it is transmitted to produce projected light that carries the image of a particular frame recorded on the film F.

The projected light passes through the imaging lens unit 32 and focused on the light-receiving plane of the CCD sensor 34, and the image recorded on the film F is photoelectrically read.

A resulting output signal from the CCD sensor 34 is amplified with the amplifier 36, converted into a digital signal with the A/D converter 38, and then sent to the image processing apparatus 14.

The color filter plate 26 is a turret filter provided with a red (R), green (G), and blue (B), and optionally infrared ray (IR) filters and rotated by a rotating unit (not shown) so as to insert the respective filters into the optical path of the reading light.

In the illustrated scanner 12, the respective color filters of the color filter plate 26 are sequentially inserted and the image recorded on the film F is read three times so that the image is separated to three primary colors of R, G, and B and read.

The carriers 30 are detachably mounted on the housing of the scanner 12. The scanner 12 is provided with dedicated carriers 30 depending on the size of films such as an Advanced Photo System and negatives (or reversals) of 135 size, and a carrier 30 corresponding to a loaded film is mounted by changing the carriers 30 in accordance with a film size and the like.

An image (frame) recorded on a film and used to manufacture a print is transported to and held at a predetermined reading position by the carrier.

Each of the carriers 30 is provided with a bar code reading unit for reading a bar code such as a DX code, expanded DX code, FNS code and the like which are optically recorded on the film F. Further, the carrier for the Advanced Photo System has a magnetic information recording/reading unit in correspondence to a magnetic recording medium formed on the film F of the Advanced Photo System.

The bar codes and the magnetic recording medium are read when the film F is transported by the carriers 30 and various kinds of information is supplied to the predetermined position of the image processing unit 14, the printer/processor 16 and the like.

In the present invention, what reads the image of the film F is not limited to the scanner 12. For example, a scanner that reads an image by separating it to three primary colors may be used, the scanner employing an illuminant composed of an LED or the like which individually emits reading lights of the three primary colors. Otherwise, a scanner that slit scans an image using line CCD sensors for three primary colors may be used.

The photoprinter 10 (the image processing apparatus of the present invention) is not limited to the scanner for reading the image recorded on the film F photoelectrically. That is, the photoprinter 10 may receive image data carrying images from various kinds of image data supply sources and manufacture prints on which the images are reproduced. Exemplified as the image data supply sources are an image reading apparatus for reading a reflecting original, an image recording device such as a digital camera, a communication device 21 such as a computer communication network and the like, on image data recording medium 19a such as a floppy disc, and so forth.

The scanner 12 reads the image recorded on the film F twice. That is, the scanner 12 carries out prescan for reading the image at a low resolution and fine scan for obtaining image data corresponding to the output of a print.

The prescan is carried out under prescan reading conditions which are set beforehand to read the images of the entire film F to be read with the scanner 12 so that the image sensor 34 can read the images without being saturated. In contrast, the fine scan is carried out under the fine scan rending conditions which are set to each image (frame) from prescan data so that the image sensor 34 is saturated at a density which is somewhat lower than the minimum density of each image.

Accordingly, the output signals in the prescan and the output signals in the fine scan are basically the same data except that they have a different resolution and a different output level.

As described above, the output signal (image data) from the scanner 12 is supplied to the image processing apparatus 14. The image processing apparatus 14 relates to the present invention.

Figure 2:
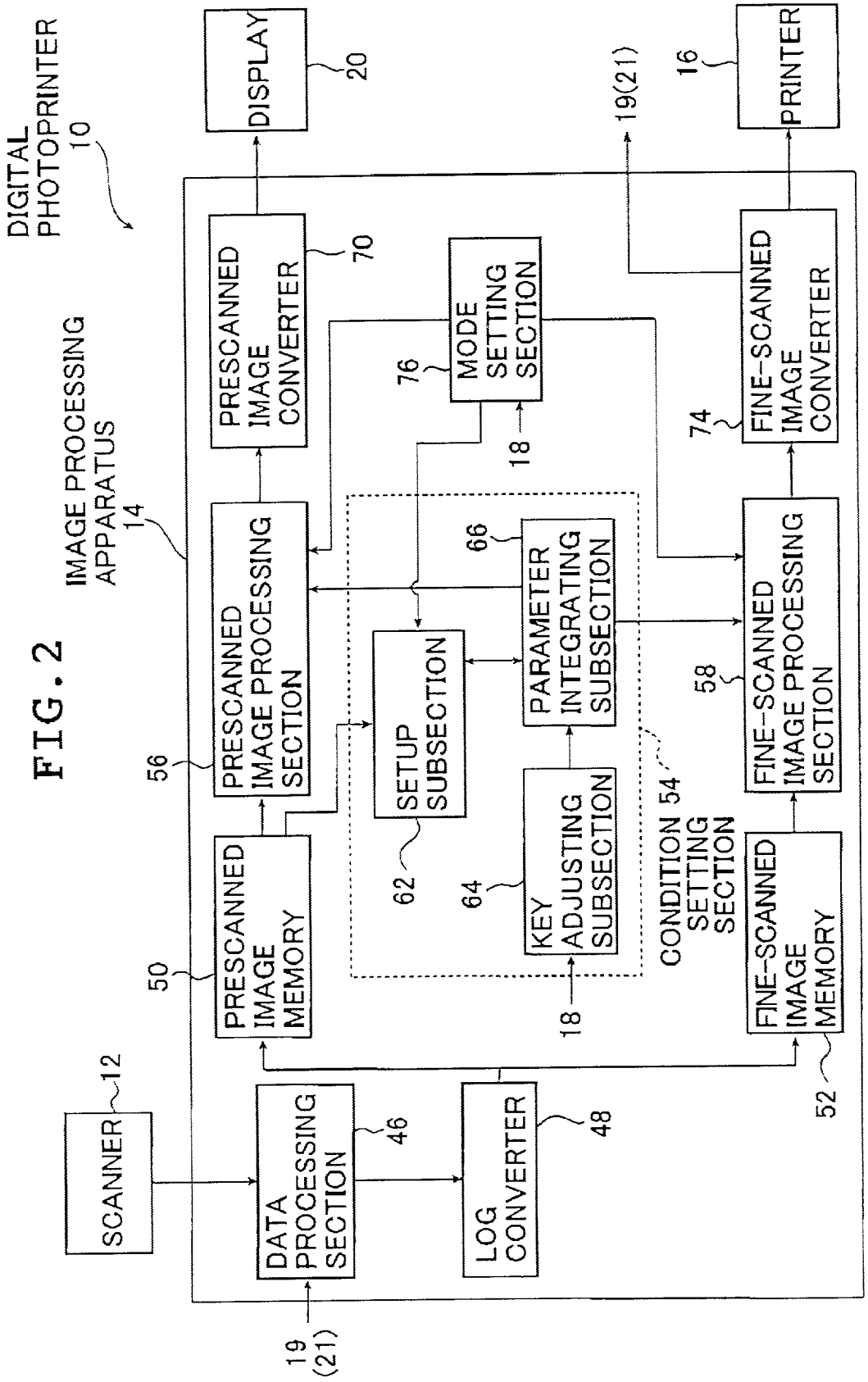
FIG. 2 is a block diagram of an embodiment of the image processing apparatus of the digital photoprinter shown in FIG. 1.

FIG. 2 shows a block diagram of the image processing apparatus 14. As shown in FIG. 2, the image processing apparatus 14 (hereinafter, referred to as "processing apparatus 14") include: a data processing section 46, a Log converter 48, a prescanned image memory 50, a fine-scanned image memory 52, a condition setting section 54, a prescanned image processing section 56, a fine-scanned image processing section 58, a prescanned image converter 70, a fine-scanned image converter 74, and a mode setting section 76.

While FIG. 2 mainly shows the sites which are related to image processing, the processing apparatus 14 also controls and manages the photoprinter 10 in its entirety and includes a CPU that controls the entire photoprinter 10, a memory which stores the information necessary for the operation of the photoprinter 10, and so forth, in addition to the components shown in FIG. 2.

The R, G, B data output from the scanner 12 is subjected to predetermined processing such as DC offset correction, darkness correction, shading correction and the like in the data processing section 46.

Next, the output data having been processed in the data processing section 46 is subjected to Log conversion in the Log converter 48 through, for example, a LUT (look-up table) or the like and converted into digital image (density) data, and prescanned image) data is stored in the prescanned image memory 50 and fine-scanned (image) data is stored in the fine-scanned image memory 52, respectively.

It should he noted that the processing apparatus 14 of the present invention also can process image data supplied from various kinds of image data supply sources such as the digital camera and the like, as described above.

At the time, the image data is converted into data according to the processing apparatus 14 (photoprinter 10) and the number of the pixels thereof is adjusted by thinning-out, interpolation, and the like in a data converting section (not shown) so that the image data is made to image data corresponding to prescanned image data and fine-scanned data. Subsequently, the prescanned image data and is supplied to the prescanned image memory 50 and the fine-scanned data is supplied to the fine-scanned image memory 52, respectively, and then processing similar to the above processing is carried out thereto.

The condition setting section 54 sets the image processing conditions of the respective images (frames) in the prescanned image processing section 56 and in the fine-scanned image processing section 58 and includes a setup subsection 62, a key adjusting subsection 64, and a parameter intergrating subsection 66.

The setup subsection 62 is a section for setting the image processing conditions of each frame through image analysis using the prescanned image data. For example, the setup subsection 62 calculates as the image processing conditions of the frame appropriate correction amounts of the image for reproducing an appropriate image which should be applied to the image data of the frame in the image processing to which the image processing apparatus 14 subjects the image data of the frame.

Specifically, the setup subsection 62 produces a density histogram of an image, calculates image characteristic amounts such as a minimum density, a maximum density, an average density, and the like, and further extracts a main subject (a region of a face) using prescanned image data. Further, the setup subsection 62 sets the reading conditions of the fine-scan and various kinds of the image processing conditions in the prescanned image processing section 56 and the fine-scanned image processing section 58, which will be described later, using the density histogram, the image characteristic amounts, and the like.

The above processing such an the various kinds of the image analyzing methods and the various kinds of the image processing conditions can be set by a known method. Note that the processing is changed or switched by the mode setting section 76 in accordance with a selected operation mode, which will be described later in detail. For example, as the content of the processing set by the setup subsection 62 Which is changed or switched by the mode setting section 76, at least one of operation algorithm for calculating the appropriate correction amounts of the image and operation parameters therefor can be exemplified.

The key adjusting subsection 64 is a section for calculating an amount of adjustment of an image in accordance with various kinds of instructions for adjustment which are input through various kinds of adjusting keys such as a density adjusting key, a color adjusting key, a gradation adjusting key, a sharpness adjusting key, and the like set to the keyboard 18a and through the mouse 18b and supplies the amount of adjustment of the image to the parameter intergrating subsection 66.

The parameter intergrating subsection 66 receives the image processing conditions set by the setup subsection 62 and sets the image processing conditions to the predetermined positions of the prescanned image processing section 56 and the fine-scanned image processing section 58. The parameter intergrating subsection 66 adjusts or corrects the image processing conditions set to the respective sections in accordance with the amount of adjustment of the image calculated by the key adjusting subsection 64, creates processing conditions for performing the adjustment and sets the adjusted or corrected processing conditions to both the prescanned image processing section 56 and the fine-scanned image processing section 58.

In the processing apparatus 14, the image of the prescanned image data stored in the prescanned image memory 50 is processed in the prescanned image processing section 56, and the image of the fine-scanned image data stored in the fine-scanned image memory 52 is processed an the fine-scanned image processing section 58, respectively.

The prescanned image processing section 56 and the fine-scanned image processing section 58 basically have the same arrangement except that the image data processed thereby has a different pixel density, and they execute similar processing. Thus, the fine-scanned image processing section 58 will be described as a typical example in the following explanation.

Figure 3:
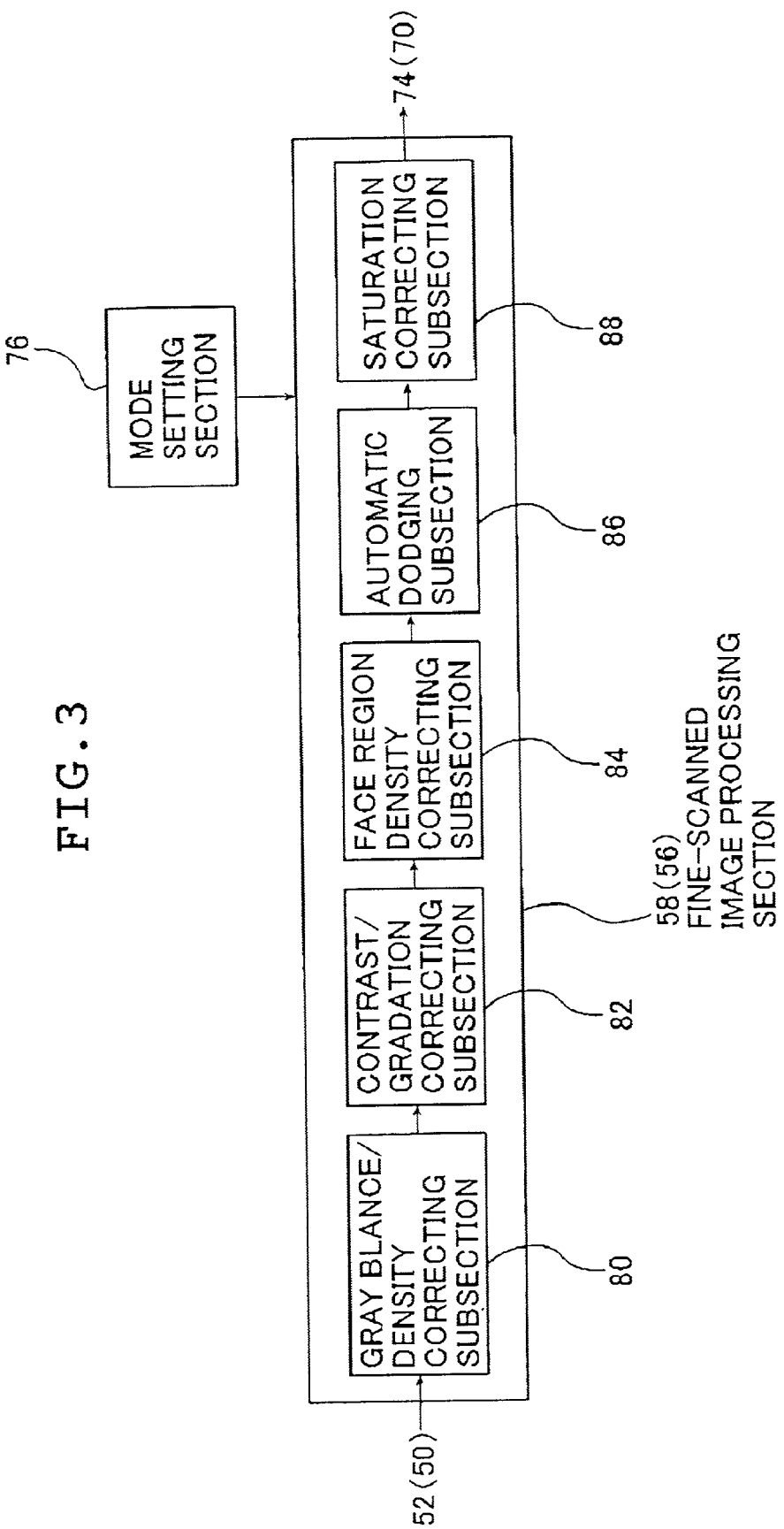
FIG. 3 is a block diagram of a fine-scanned image processing section and a pre-scanned image processing section of the image processing apparatus shown in FIG. 2.

The fine-scanned image processing section 56 (prescanned image processing section 56) is a section for reading out the fine-scanned image data (prescanned image data) stored in the fine-scanned image memory 52 (prescanned image memory 50) and subjects it to various kinds of image processing. In the illustrated example, the fine-scanned image processing section 58 includes a gray balance/density correcting subsection 80, a contrast/gradation correcting subsection 82, a face region density correcting subsection 84, an automatic dodging processing subsection 86, and a saturation correcting subsection 88 as shown in FIG. 3. It should be noted that it is needless to say that the image processing apparatus of the present invention may include image processing subsections for performing various kinds of image processing in addition to the above processing such as an electronic magnification processing subsection for enlarging (expanding) and reducing (compressing) an image in accordance with a print size and the like, an sharpness enhancement processing subsection for sharpening an image by enhancing the edge thereof, and the like.

The gray balance/density correcting subsection 84 is a section for correcting the gray balance of an image (color balance correction) and for correcting the density of respective colors (R, G, and B) using, for example, a look-up table (LUT).

The contrast/gradation correcting subsection 82 is a section for correcting the contrast and the gradation of an image using a LUT likewise.

The face region density correcting subsection 84 is a section for adjusting the density of a face region so as to finish the face of a person to an appropriate skin color in accordance with a result of extraction of the face.

The automatic dodging processing subsection 86 is a section for applying an effect similar to dodging processing in direct exposure by image (data) processing. Specifically, the automatic dodging processing subsection 86 is a section for carrying out processing for matching the dynamic range of an output image to a density reproducing possible region (print reproducing region) in on output machine (printer/processor 16 in the illustrated example) by the compression of gradation by compressing the dynamic range (difference between the maximum density and the minimum density) of an original image linearly or non-linearly. The dodging processing is described in detail in Japanese Unexamined Patent Application Publication. No. 10-13680 filed by the same assignee.

Further, the saturation correcting subsection 88 corrects the saturation of an image (saturation control) by a matrix calculation and the like.

The processing apparatus 14 of the illustrated example includes the mode setting section 76. Five operation modes, that is, an NG reduction mode, a high image quality mode, an image equalizing mode, a high speed mode and a standard mode are set to the mode setting section 76.

The mode setting section 16 changes the content of the processing which is carried out in the setup subsection 62, that is, the content (method) of the image analyzing and the image processing conditions set in the setup subsection 62 as well as changes the content of the image processing which is executed in the fine-scanned image processing section 58 (prescanned image processing section 56) in accordance with a selected operation mode.

Accordingly, the fine-scanned image data (prescanned image data) is subjected to the image processing in accordance with the selected mode.

The NG reduction mode is an operation mode for improving productivity by the improvement of yield by preventing the output of an inappropriate print (NG print). Thus, it is an operation mode suitable for print manufactures which manufacture prints in large quantities.

In a high contrast scene such as when photographing is performed with an electronic flash at night or in back light, there is a very high probability of occurrence of NG prints due to the dull-shadowed face or the washed-out face of a person in a scene of high-contrast. In such a situation, the NG reduction mode removes the washed-out or dull-shadowed face of a person by bringing a washed-out or dull-shadowed image inwardly of a print reproducing region by softening the gradation of an image, controlling a density based on the face region of the person and compressing the gradation of the image by the automatic dodging processing so as to reduce the NG prints.

In the NG reduction mode, it is preferable to perform at least one of the softening of image gradation by the gradation correction in the contrast/gradation correcting subsection 82, the density control based on the face region of a person (for example, the density control of the face region in the face region density correcting subsection 84, overall density control in accordance with a result of an extracted face, and the like), and the automatic dodging processing in the automatic dodging processing subsection 86. Among them, it is preferable to perform at least the density control based on the face region of the person, and, in particular, it is preferable to perform the density control based on the face region of the person and the gradation softening. Further, in the NG reduction mode, the conditions of the automatic dodging processing may be set so as to perform compression near to the intermediate density region of an image which is not ordinarily compressed in order to more appropriately express a skin color.

In the illustrated example, when the NG reduction mode is selected as an example, the mode setting section 76 changes the image analyzing methods and the image processing conditions set in the setup subsection 62 as well as changes the image processing which is executed in the fine-scanned image processing section 58 so as to execute the face region density correction, the gradation softening, and the automatic dodging processing.

The high image quality mode is an operation mode which puts an emphasis on the quality of a photograph (quality of images reproduced on a print). Thus, it is an operation mode suitable for print manufactures such as photo studios that receive orders for a lot of prints to be enlarged to a very large size an well an many special orders.

In the high image quality mode, it is preferable to perform at least one of gray/color gradation control (gray balance correction, gradation correction, and density correction) in the gray balance/density correcting subsection 80 and the contrast/gradation correcting subsection 82 which are carried out in accordance with scene information, exposure information, and a kind of a film (trade name, grade, sensitivity, and the like), face region density correction, automatic dodging processing, and the saturation correction in the saturation correcting subsection 88. Among them, it is preferable to carry out at least the gray/color gradation control in accordance with the scene information and the like.

With this operation, an optimum image processing can be performed to a pertinent image (photographed scene) and an image of high quality can be output.

In the illustrated example, when the high image quality mode is selected as an example, the mode setting section 76 changes the image analyzing methods and the image processing conditions set in the setup subsection 62 as well as changes the image processing which is executed in the fine-scanned image processing section 58 so as to execute the gray/color gradation control according to the scene information and the like and the saturation correction and the automatic dodging processing according to a result of analysis of a scene, and the like.

Further, in the high image quality mode, it is preferable to verify an image by displaying it on a monitor (display 20) or by creating a test pint of the image and to set the photoprinter 10 so that an operator can set a contribution ratio of image processing to be executed and can adjust the image according to a result of the verification.

Note that when the Advanced Photo System is employed, magnetic information may be utilized as the scene information and the exposure information, whereas when an image file of images and the like photographed by the digital camera is to be processed, the information recorded on a header may be utilized as the scene information and the exposure information.

Further, the information may be optically recorded on the film F externally of the image regions thereof and obtained by reading and cutting out it by the CCD sensor 34 or the operator may obtain information from a customer (person requesting the manufacture of a print) and input it through the keyboard 19a or the like.

The equalizing mode is an operation mode for suppressing the fluctuation between frames in one case. Thus, it is an operation mode suitable when commodity samples are created and when similar scenes are continuously created.

In the equalizing mode, the image processing conditions of each frame is set using the entire image data of one case and the image data of each frame. With this operation, prints of uniform quality can be output by suppressing the fluctuation between the frames. Note that in the equalizing mode, it is preferable to appropriately select image processing to be executed in accordance with the characteristics of the apparatus, and the like.

Accordingly, when the equalizing mode is selected, the mode setting section 76 changes the image analyzing methods and the image processing conditions set in the setup subsection 62 so that the prescanned image data of all the frames of one case can be used in addition to the prescanned image data of each frame.

In the present invention, it should be noted that when, for example, prints are to be created from the film F, one case ordinarily means all the frames of one film, whereas when images are supplied from an image data supply source such as a digital camera and the like, one case means all the images (all the frames) supplied at the same time for the creation of prints. Otherwise, one case may be composed of a collection of the images instructed by a customer.

When the equalizing mode is selected, it is preferable that the scanner 12 begin fine scan after all the frames of the one film F is prescanned. Note that the fine scan may be executed after all the frames of the film F is prescanned also in other operation mode.

The high speed mode is an operation mode for putting an utmost emphasis on a print manufacturing speed (for example, the number of output prints per unit time).

In the high speed mode, the lace region density correction, the automatic dodging processing, and the like, which are time-consuming, are not carried out at all, and only the gray balance correction, the density correction and further the gradation correction, for example, are carried out. When the high speed mode is selected in the illustrated example, the mode setting section 76 changes the image analyzing methods and the image processing conditions set in the setup subsection 62 as well as changes the image processing which is executed in the fine-scanned image processing section 58 so as to execute these three kinds of the image processing steps.

With this operation, the maximum output capacity of the photoprinter can be exerted and a lot of prints can be output in a short time.

The standard mode is an operation mode for manufacturing a standard print, that is, an operation mode in which the image processing conditions are set and the image processing is executed such that image quality, print productivity, image uniformity in one case, and the like can be exhibited in good balance by making most of, for example, the characteristics of the above respective modes on average.

A device for selecting the operation modes is not particularly limited, that is, an operation mode change switch or the like may be set, an operation mode key may be provided with the keyboard 18a (a function key or the like may be utilized), or the operation modes may be selected by a GUI (graphical user interface) or the like.

Further, an operation mode may be selected by a maker when the image processing apparatus is shipped from a factory or may be selected by a service man in a user's shop according to the desire of a user. However, it is particularly preferable that the user can optionally select an operation mode by a simple manipulation using a means such as the GUI or the like.

As described above, the various kinds of the operation modes are set to the processing apparatus 14 so that any one of them is selected as well as the mode setting section 76 changes the image analyzing methods and the image processing conditions set in the setup subsection 62 as well an changes the image processing which is executed in the fine-scanned image processing section 58 (prescanned image processing section 56) in accordance with a selected operation, mode.

Therefore, according to the image processing apparatus of the present invention, there can be realized a photoprinter which can manufacture a print that can satisfy a purpose of the print manufacture and the person requesting the manufacture of a print by selecting an operation mode in accordance with a state in which the photoprinter is used in the print manufacture and with an intention of the person requesting the manufacture of the print as well as which can sufficiently satisfy the characteristics required by the user.

In the Image processing apparatus of the present invention, it should be noted that the operation modes are not limited to the above-mentioned examples and various kinds of operation mode can be utilized in accordance with the performances required to the photoprinter 10.

Exemplified as the operation modes are, for example, an operation mode for executing amount of peripheral light correction, distortion correction, and the like for the purpose of stably outputting a print (image) of high quality from a film on which images are photographed with a compact camera and a lens-fitted photographic film (film with lens) using a less-expensive lens, an operation mode for imitating the colors, gradation, and sharpness of a conventional analog print that is manufactured by printing images on a photographic paper by means of light passing through a film, and the like.

The prescanned image data having been subjected to the image processing in the prescanned image processing section 56 is supplied to the prescanned image converter 70 and the fine-scanned image data having been subjected to the image processing in the fine-scanned image processing section 58 is supplied to the fine-scanned image converter 74, respectively.

The prescanned image converter 70 is a section where the prescanned image data having been subjected to the image processing is subjected to color reproduction processing using, for example, a three-dimensional LUT (3D-LUT) and displayed on the display 20, that is, a section where the prescanned image data is converted into image data the colors of which are reproduced on the display 20.

In contrast, the fine-scanned image converter 74 is a section where the fine-scanned image data having been subjected to the image processing is subjected to color reproducing conversion processing using a 3D-LUT in the same way so that the fine-scanned image data is converted into on image which is processed by the printer/processor 16, that is, so that the fine-scanned image data is converted into image data the colors of which are reproduced by the printer/processor 16.

The prescanned image data having been subjected to the color reproducing conversion processing in the prescanned image converter 70 is supplied to the display 20, whereas the fine-scanned image data having been subjected to the color reproducing conversion processing in the fine-scanned image converter 74 is supplied to the printer/processor 16, respectively.

The prescanned image data and the fine-scanned image data which have been converted in the prescanned image converter 70 and the fine-scanned image converter 72 may be supplied to the medium driver 19 to be recorded (written) on the image data recording medium 19a or delivered via communication device 21 such as the internet.

The display 20 is not particularly limited and various kinds of known display means such as a CRT (cathode ray tube), a liquid crystal display, and the like can be utilized.

In the printer/processor 16, for example, after a light-sensitive material is cut to a preset length in accordance with a print, information is back printed onto each of the light-sensitive materials having been cut. Subsequently, each light-sensitive material (photographic paper) is scan exposed two-dimensionally with light beams for R exposure, G exposure and B exposure that are modulated in accordance with the fine-scanned image data supplied from the processing apparatus 14 (fine-scanned image converter 74) so as to record a latent image thereon. Then, the resulting light-sensitive materials are subjected to predetermined wet development processing such as color development, bleach-fixing, rinsing and so forth and dried as prints which are then sorted and accumulated.

While the image processing apparatus and the photo-printer using the same of the present invention have been described above in detail, the present invention is by no means limited to the above-described embodiment and it goes without saying that various improvements and modifications can be made within the range which does not depart from the gist of the present invention.

As described above in detail, according to the image processing apparatus of the present invention, there can be realized the photo printer which can preferably satisfy the various performances required to the photoprinter such as productivity, the quality of an image reproduced on a print, uniformity of images of one case, a print output speed and the like and which can manufacture a preferable print in accordance with a stare in which the photoprinter is used in a print manufacture and with an intention of a person requesting the manufacture of a print.

Further according to the photoprinter of the present invention, the performance of the image processing can be changed in accordance with the intention of the user and the using state of the photoprinter at the time of manufacturing the photoprints.

As a result according to the present invention, the appropriate prints reproduced preferably in color and density in accordance with the intention of the user and the using state of the photoprinter can be manufactured.

What is claimed is:

1. An image processing apparatus comprising:
    a condition setting section for setting an image processing conditions of image data by analyzing said image data supplied from an image data supply source;
    an image processing section for subjecting said image data to image processing in accordance with said image processing conditions set in said condition setting section;
    a mode setting section including a plurality of operation modes, said movie setting section setting a operation mode from among said plurality of operation modes and changing at least one of a processing content in said condition setting section and a content of the image processing executed in said image processing section in accordance with said operation mode set.

2. The image processing apparatus according to claim 1, further comprising:
    a selection devise for selecting said operation mode to set said operation mode in said mode setting section out of said plurality of operation modes.

3. The image processing apparatus according to claim 1, wherein said plurality of operation modes are at least two of an operation mode for reducing inappropriate prints, on operation mode for putting an emphasis on image quality, an operation mode for reducing the fluctuation of one case, and an operation mode for putting an emphasis on production speed.

4. The image processing apparatus according to claim 2, wherein:
    density control based on the face region of a person is executed and further gradation is softened in said operation mode for reducing inappropriate prints;
    gray/color gradation control is executed in accordance with at least one of a photographed scene, film exposure and a type of a film in said operation mode for putting an emphasis on image quality;
    image processing conditions are set using all the image data of one case in said operation mode for reducing the fluctuation of one case; and
    gray balance correction and density correction are executed in said operation mode for putting an emphasis on production speed.

5. The image processing apparatus according to claim 1, wherein the image data supply source is at least one of a scanner which reads photoelectrically an image from a photographic film to obtain said image data, a medium driver which reads out said image data from a image data recording medium and a communication device which receives said image data.

6. A photoprinter comprising:
    an image data supply source for supplying image data of an image;
    a condition setting section for setting an image processing conditions of said image data for outputting a print on which said image is reproduced, by analyzing said image data supplied from said image data supply source;
    an image processing section for subjecting said image data to image processing in accordance with said image processing conditions set in said condition setting section; and
    a print section for outputting the print on which said image has been reproduced based on the image data subjected to the image processing by the image processing section;
    further including: a plurality of operation modes; and
    a mode setting section for setting a operation mode from among said plurality of operation modes and changing at least one of a processing content in said condition setting section and a content of the image processing executed in said image processing section in accordance with said operation mode set.

7. The photoprinter according to claim 6, further comprising:
    a selection device for selecting said operation mode to set said operation mode in said mode setting section out of said plurality of operation modes.

8. The photoprinter according to claim 6, wherein said plurality of operation modes are at least two of an operation mode for reducing inappropriate prints, an operation mode for putting an emphasis on image quality, an operation mode for reducing the fluctuation of one case, and an operation mode for putting an emphasis on production speed.

9. The photoprinter according to claim 8, wherein:
    density control based on the face region of a person is executed and further gradation is softened in said operation mode for reducing inappropriate prints;
    gray/color gradation control is executed in accordance with at least one of a photographed scene, film exposure and a type of a film in said operation mode for putting an emphasis on image quality;
    image processing conditions are set using all the image data of one case in said operation mode for reducing the fluctuation of one case; and
    gray balance correction and density correction are executed in said operation mode for putting an emphasis on production speed.

10. The photoprinter according to claim 6, wherein the image data supply source is at least one of a scanner which reads photoelectrically the image from a photographic film to obtain said image data, a medium driver which reads out said image data from the image data recording medium and a communication device which receives said image data.

11. The photoprinter according to claim 6, wherein said condition setting section calculates as the image processing conditions appropriate correction amounts of the image for reproducing preferably the image based on said image data.

12. The photoprinter according to claim 11, wherein said mode setting section changes as said processing content in the condition setting section at least one of operation algorithm for calculating the appropriate correction amounts of the image and operation parameters therefor.

* * * * *

UNITED STATES PATENT AND TRADEMARK OFFICE
CERTIFICATE OF CORRECTION

PATENT NO. : 6,989,914 B2  
DATED : January 24, 2006  
INVENTOR(S) : Yasuharu Iwaki It is certified that error appears in the above-identified patent and that said Letters Patent is hereby corrected as shown below:

Column 13,  
Line 13, should read as follows -- modes, said mode setting section setting a operation --.

Signed and Sealed this

Fourth Day of April, 2006

JON W. DUDAS  
*Director of the United States Patent and Trademark Office*